(12) United States Patent
Hynes et al.

(10) Patent No.: US 6,257,606 B1
(45) Date of Patent: Jul. 10, 2001

(54) AXLE SEAT RESTRAINT, AXLE ASSEMBLY AND METHOD

(75) Inventors: Paul R. Hynes, Vancouver, WA (US); James W. Larson, Mooresville, NC (US); David R. Wheeler, Vancouver, WA (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/326,521

(22) Filed: Jun. 4, 1999

Related U.S. Application Data
(60) Provisional application No. 60/135,285, filed on May 21, 1999.

(51) Int. Cl.[7] .................. B60G 11/10; B60G 11/113; B60G 11/04
(52) U.S. Cl. ................. 280/124.175; 280/124.17; 280/124.163; 267/40; 267/52
(58) Field of Search .................. 267/52; 301/124.1; 280/124.1, 124.116, 124.175, 124.163

(56) References Cited

U.S. PATENT DOCUMENTS

| | | | |
|---|---|---|---|
| 366,425 | 7/1887 | Partridge | 267/52 |
| 613,803 | 11/1898 | Knight | 267/52 |
| 1,432,231 | 10/1922 | Barron | 267/52 |
| 1,531,641 * | 3/1925 | Barron | 267/52 |
| 1,550,605 | 8/1925 | Cosgrove et al. | 267/52 |
| 2,007,793 * | 7/1935 | Crawford | 267/52 |
| 2,072,198 * | 3/1937 | Davis | 267/52 |
| 2,129,656 | 9/1938 | Dougherty | 267/52 |
| 2,191,941 | 2/1940 | Reid | 280/124.175 |
| 2,745,677 | 5/1956 | Walter | 280/680 |
| 3,080,161 | 3/1963 | Felburn | 267/229 |
| 3,097,840 | 7/1963 | Bajer | 267/52 |
| 3,111,308 | 11/1963 | Wenzel et al. | 267/52 |
| 3,111,309 | 11/1963 | Andren et al. | 267/52 |
| 3,144,246 | 8/1964 | Hamlet | 267/52 |
| 3,378,250 | 4/1968 | Marti | 267/52 |
| 3,398,946 | 8/1968 | Mathers | 267/52 |
| 3,674,249 | 7/1972 | McGee | 267/52 |
| 3,804,467 * | 4/1974 | Austermann | 301/127 |
| 4,691,937 * | 9/1987 | Raidel | 280/711 |
| 4,733,876 * | 3/1988 | Heider | 280/6 H |
| 4,801,129 * | 1/1989 | Wells | 267/52 |
| 4,804,205 * | 2/1989 | Parsons | 280/718 |
| 4,895,350 * | 1/1990 | Schoof | 267/52 |
| 5,328,159 * | 7/1994 | Kaufman | 267/52 |
| 5,401,054 * | 3/1995 | Phillips | 280/718 |
| 5,476,251 | 12/1995 | Moses et al. | 267/52 |
| 5,950,971 * | 9/1999 | Koumbis | 248/200 |
| 6,032,967 * | 3/2000 | Ogoniek | 280/124.175 |

* cited by examiner

*Primary Examiner*—J. J. Swann
*Assistant Examiner*—David Divine
(74) *Attorney, Agent, or Firm*—Klarquist Sparkman Campbell Leigh & Whinston, LLP

(57) ABSTRACT

A spring movement limiting device that limits lateral shift of a spring in a vehicle suspension along a vehicle axle direction includes a first element and a second element. The first element is coupled to the axle and to the spring. The second element is separate from and engageable with the first element. The second element is fixed at a predetermined position relative to the vehicle axle. Engagement between the first element and the second element limits the first element and spring from movement in the vehicle axle direction.

30 Claims, 6 Drawing Sheets

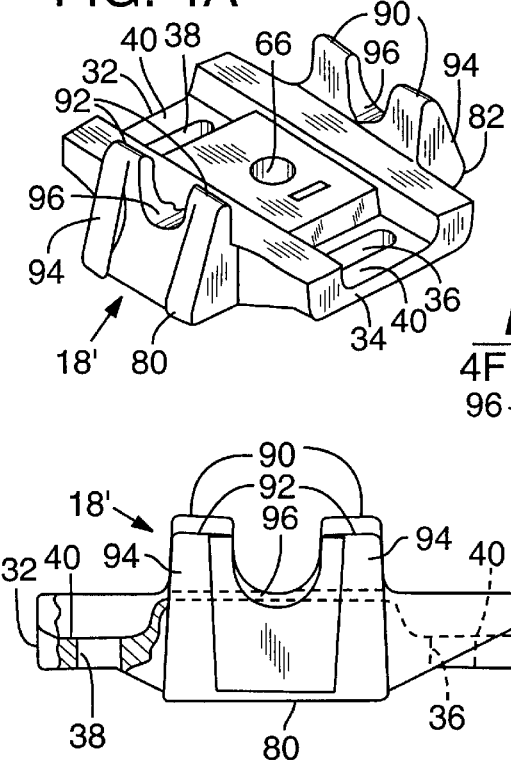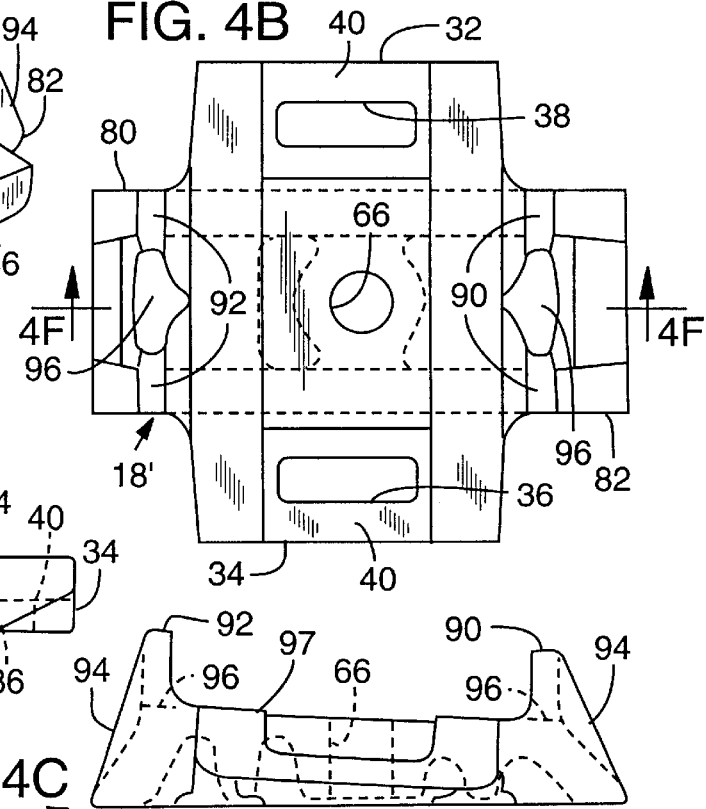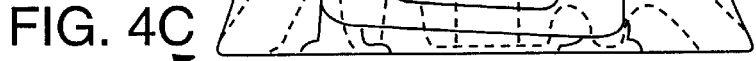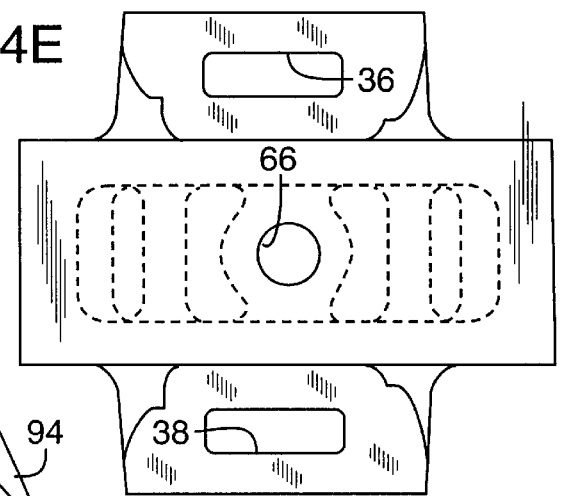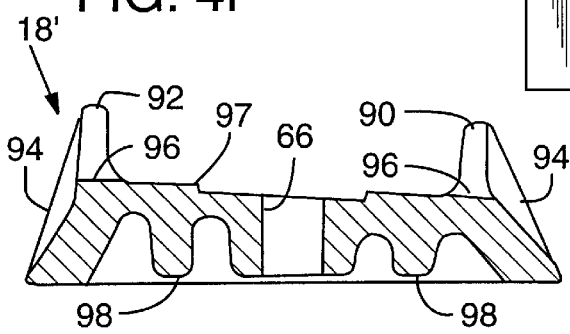

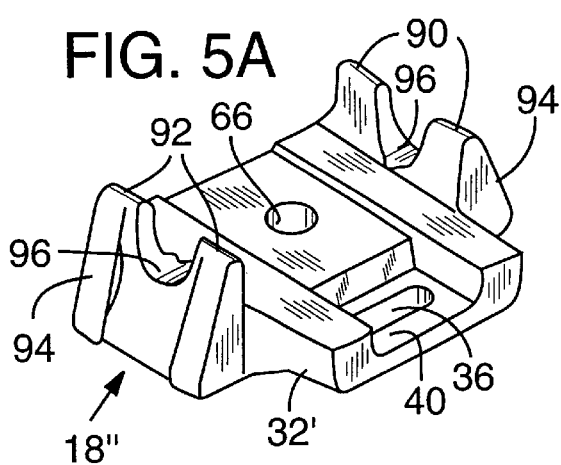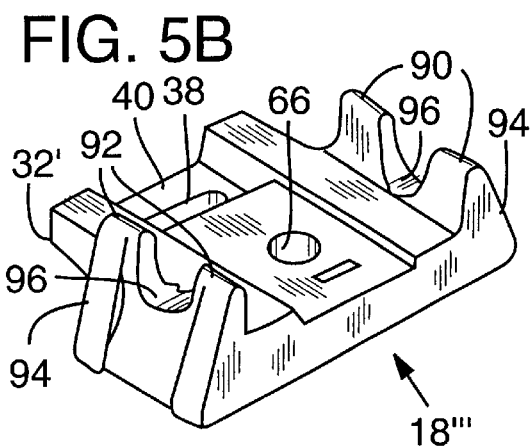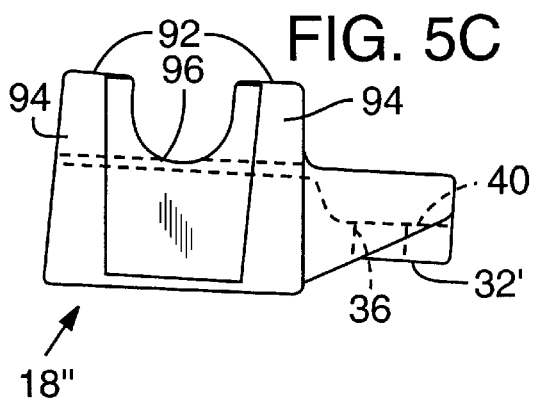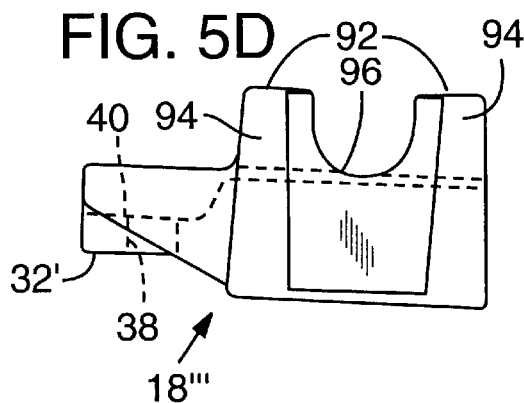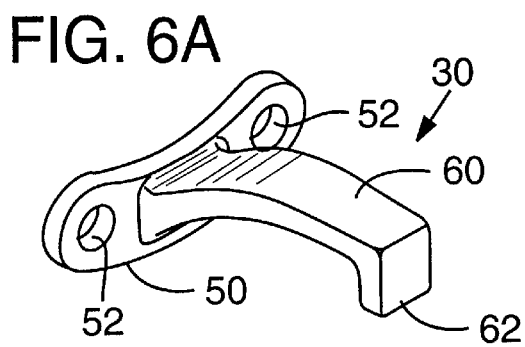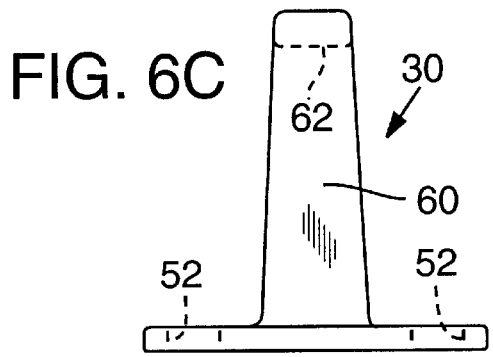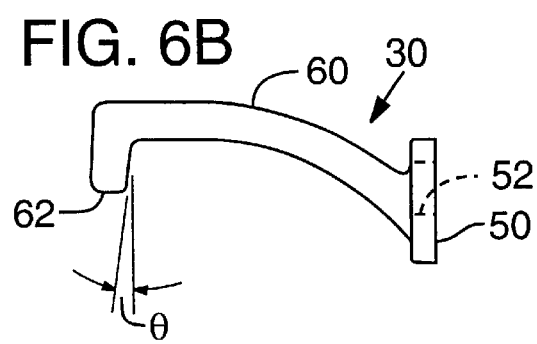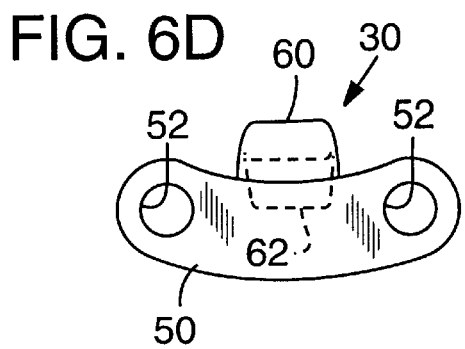

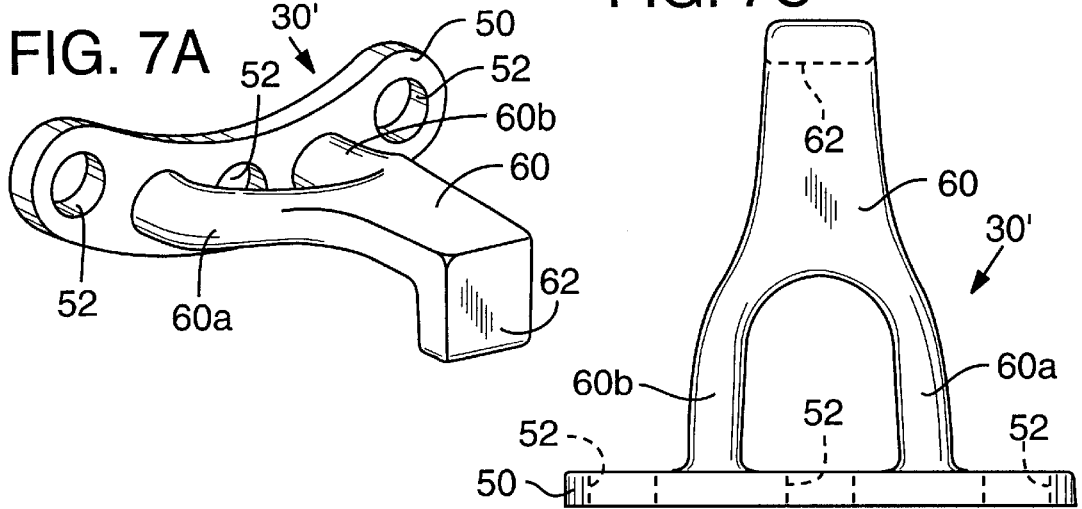
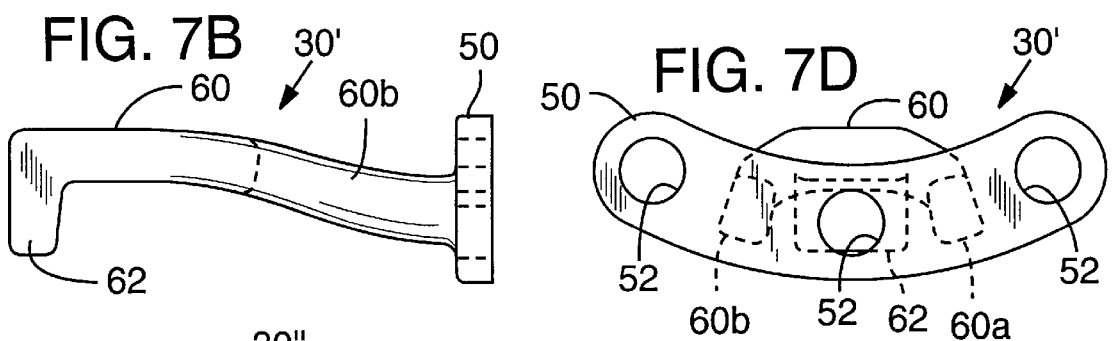
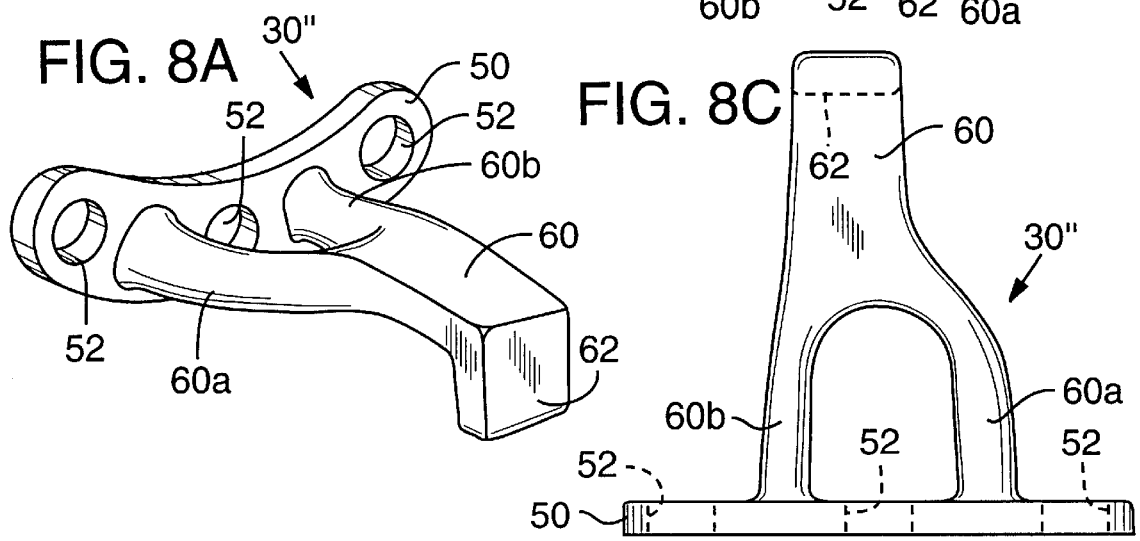
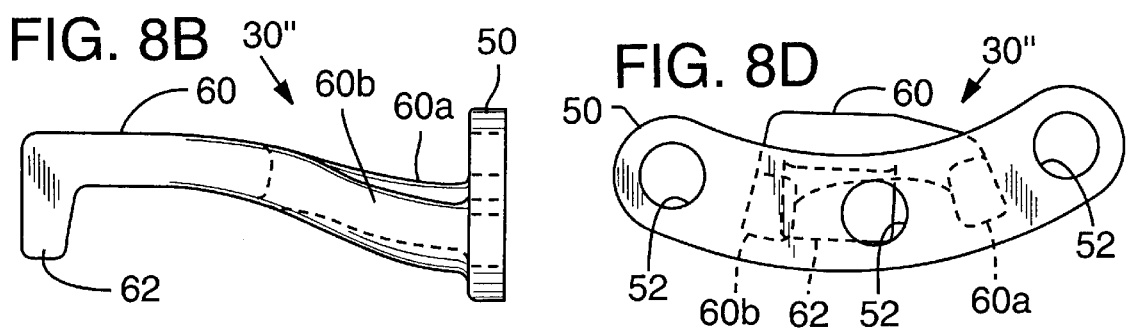

AXLE SEAT RESTRAINT, AXLE ASSEMBLY AND METHOD

RELATED APPLICATION

This application claims the benefit of U.S. provisional patent application Ser. No. 60/135,285, filed May 21, 1999.

FIELD OF THE INVENTION

This invention relates to an axle seat restraint for a vehicle suspension system, an axle assembly with the axle restraint, and a method of restraining the axle seat during vehicle operation.

BACKGROUND OF THE INVENTION

FIGS. 1, 2A and 2B show a prior art vehicle suspension system in which one or more leaf springs 10 are coupled to an axle 12 with the leaf springs positioned below the axle. In general, configuring the suspension with the leaf springs 10 below the axle 12 provides a lower height suspension, which is desirable in some applications.

In this prior art construction, the axle 12 may have an upwardly projecting dowel or pin 14 that is inserted into an aperture of an upper axle retainer 16. An axle seat 18 is positioned between the leaf springs 10 and the axle 12. The axle seat 18 bears against the lower surface of the axle 12. As shown in FIG. 2A, the axle seat 18 may have an aperture 19 for receiving a dowel or pin 21 extending from the upper surface of the uppermost leaf spring of the leaf springs 10 to position the axle seat 18 relative to the leaf springs 10. The leaf springs 10 may be slidably or otherwise connected directly and/or indirectly (e.g., through shock absorbers as shown or otherwise coupled through other components) to a frame rail 24 of the vehicle.

A clamping element 20, which is generally aligned with the axle seat 18 and the upper axle retainer 16, may be provided and held in place by a pair of U-bolts 22, one being positioned on each side of the leaf springs 10. As a result, the leaf springs 10 and the axle 12 are held in place relative to each other by the combination of the upper axle retainer 16 with the pin 14 received in the aperture thereof, the axle seat 18, the pin 21, the clamping element 20 and the U-bolts 22 that secure this assembly together.

In other prior art configurations where the axle is positioned below the leaf springs, rather than above the leaf springs as shown in FIGS. 1, 2A and 2B, it is possible to weld the axle seat to the top surface of the axle. Due to stress concentrations that occur at the lower surface of the axle, however, welding the axle seat at this location can cause problems.

The prior art construction of FIGS. 1, 2A and 2B is satisfactory for vehicles operated on smooth surfaces, e.g., highways. After operation under severe conditions, however, such as on washboard roads or during off-road operation, the components of the suspension can wear and/or loosen. As a result, the assembly of the springs, axle seat, axle seat retainer and U-bolts can migrate or shift to some extent in the direction of the axle either inboard toward the frame rail or outboard away from the frame rail, which is undesirable.

SUMMARY

It would be desirable to provide an axle seat construction that would limit lateral migration or shifting of the leaf spring and the axle seat in the direction of the axle (or "axle direction") that can occur over the operating life of the vehicle.

Accordingly, in one implementation, a spring movement limiting device includes a first element and a second element. The first element is coupled to the axle and to the spring. The second element, which is separate or distinct from the first element, is fixed in place at a predetermined position relative to the vehicle axle. As a result, engagement between the first element and the second element limits movement of the first element along the axle, and thereby also limits movement of the spring along the vehicle axle.

The first element may comprise a spring retainer or axle seat, which includes a projecting leg with a slot, and the second element may comprise a fixed-length link with a projection, such as a hook end, which is engageable with the slot. The engagement between the projection and the slot limits movement of the spring retainer element relative to the axle.

The second element may be secured at a predetermined position along the direction of the axle, e.g., by being bolted to a brake flange extending from the axle. The second element may comprise a link with at least two apertures and a stem portion projecting from the base that terminates in the projection. The second element may be configured so as not to contact the spring.

The brake flange may include a periphery with a plurality of spaced brake flange apertures such that the apertures in the base of the link can be aligned with a corresponding number of brake flange apertures. Although variable, in specific implementations, the base may include two apertures or three apertures.

The first element may comprise a spring retainer with a first side with a first projecting leg that includes a first slot, and a second side with a second projecting leg that includes a second slot. This construction facilitates the use of the spring retainer at either side of the vehicle axle as one of the slots is oriented proximate the brake flange for engagement by a link coupled to the brake flange.

The axle may include an axle housing and a rotating axle rotatably supported within the axle housing. The axle housing may have a substantially flat surface, and the first element may have a substantially flat mating surface that contacts the flat surface of the axle housing. The first element may abut the axle housing below the axle. Alternatively, the first element may be positioned above the axle and may be separated from the axle by another component.

The axle seat may include a spring receiving portion, an engagement portion and an axle coupling portion. The spring receiving portion may be coupleable to a spring of the vehicle. The engagement portion may extend from the spring receiving portion and be slidingly engageable with an axle seat retainer. The axle coupling portion may be coupled to the spring receiving portion and be coupleable to the axle.

The spring retainer may include cradle portions extending from the mating surface in the fore and aft directions, respectively. The cradle portions may be engageable with respective fore and aft sides of the axle housing.

The axle seat retainer may include a mounting portion that is fixed in place at a predetermined position and an engagement portion attached to the mounting portion. The engagement portion may be slidingly engageable with the axle seat.

The first element may include an eyelet or aperture, and the second element may include a hook portion engageable with the eyelet.

The present invention is directed to new and unobvious features of this construction alone and in combination with one another, and also to methods related thereto.

BRIEF DESCRIPTION OF THE DRAWINGS

FIG. 4A is a perspective view of the axle seat of FIG. 3.

FIGS. 4B, 4C, 4D and 4E are respective top, front, side and bottom views of the axle seat of FIG. 4A.

FIG. 4F is a sectional view of the axle seat of FIG. 4A taken along the line 4F—4F of FIG. 4B.

FIGS. 5A and 5B are respective perspective views of axle seats with a single leg according to second and third embodiments.

FIGS. 5C and 5D are respective side views of the axle seats of FIG. 5A.

FIG. 6A is a perspective view of the axle seat retainer of FIG. 3.

FIGS. 6B, 6C and 6D are respective right side, top and back views, respectively, of the axle seat retainer of FIG. 6A.

FIG. 7A is a perspective view of a second embodiment of the axle seat retainer.

FIGS. 7B, 7C and 7D are respective right side, top and back views of the axle seat retainer of FIG. 7A.

FIG. 8A is a perspective view of a third embodiment of the axle seat retainer.

FIGS. 8B, 8C and 8D are respective right side, top and back views of the axle seat retainer of FIG. 8A.

DETAILED DESCRIPTION OF PREFERRED EMBODIMENTS

Figure 3:
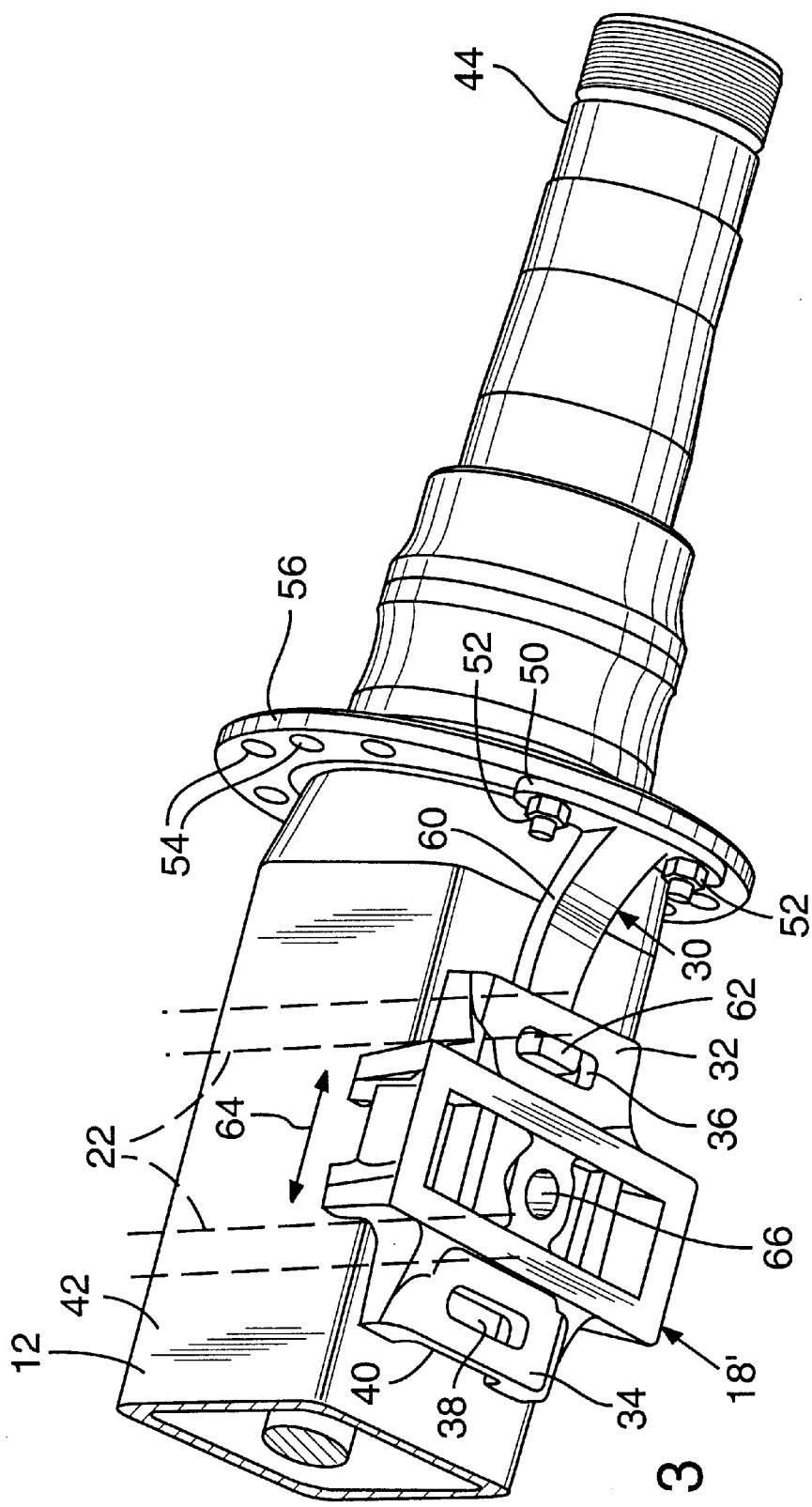
FIG. 3 is a perspective view showing one embodiment of an axle seat and axle seat retainer in accordance with the invention positioned against a lower surface of one end of an axle.

According to one embodiment of the invention, and referring generally to FIG. 3, a first element is coupled to a surface of the axle and is also coupled to the spring such that the first element is between the axle and the spring. A second element, which is engageable with the first element, is secured in place so as to be at a fixed position relative to the axle. That is, the second element is prevented from moving in either the inboard or outboard direction along the axle. By engaging the first element with the second element, the first element and the spring are limited in movement in inboard and outboard directions relative to the axle.

In the specific implementation of FIG. 3, an axle seat 18' is the first element, and an axle seat retainer 30 is the second element. In the construction of FIG. 3, the axle seat 18' has a body with first and second legs 32, 34 projecting respectively toward (outboard) and away (inboard) from the outer end of the axle 12 along the axle. The axle 12 extends in a direction that is transverse to the vehicle frame. The legs 32, 34 are each provided with a respective axle seat retainer receiving slot 36, 38, and each can include an axle seat retainer accommodating channel 40 (one being shown in FIG. 3 for leg 34). In this construction, the retainer 30 slidably engages the associated slot 36. The illustrated slots may have other shapes and may extend entirely through the legs as shown or only partially through the legs. Other mechanisms for coupling a retainer to an axle seat may also be used.

As illustrated, the leaf springs 10 are positioned beneath the axle 12, and thus the axle seat 18', which is coupled to the leaf springs 10, is coupled to the axle 12 from a position below the axle 12. The axle seat 18' and axle seat retainer 30 may also be configured for applications in which the leaf springs 10 are positioned above the axle 12.

The form of axle seat retainer 30 shown in FIG. 3 comprises a fixed-length link or body with a base 50 that has an arculate periphery and which is fixed to the axle to prevent movement along the axle 12, such as indicated by an arrow 64. In the specific implementation of FIG. 3, the base 50 includes a plurality of apertures 52. The apertures 52 are sized and positioned for alignment with apertures (such as 54) in a conventional brake flange 56 that is welded or otherwise included as a part of a brake housing and mounted to the axle 12. The axle seat retainer 30 is fastened to the brake flange 56, e.g., by through-bolts 100 and nuts 102 or other suitable fasteners. The axle seat retainer 30 also has a stem or link body portion 60 sized to extend within the channel 40. Further, the axle seat retainer 30 has a projecting latch or hook portion 62 inserted into the slot 36. The latch portion 62 in the illustrated embodiment projects in an outward direction from the axle. As a result of this construction, the link body potion 60 is sandwiched or captured between the axle seat 18' and the adjacent surface of the axle 12 when the axle seat 18' and the axle seat retainer 30 are engaged together.

In operation, the axle seat retainer 30 cooperates with the axle seat 18' to hold the axle seat 18' and thus the supported springs 10 against sliding either outwardly or inwardly along the axle 12 as indicated by arrow 64. The axle seat 18' may be detachably coupled to the axle seat retainer 30.

Figure 2B:
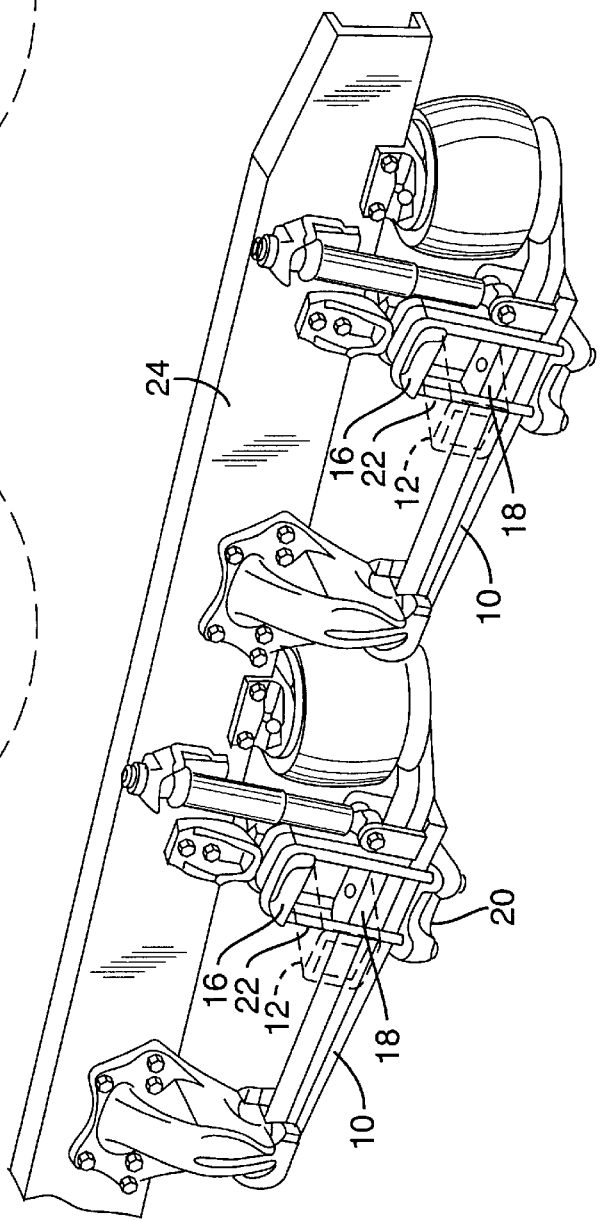
FIG. 2B is a perspective view in an assembled state of the prior art axle seat and suspension system of FIG. 1 with the axle shown in dashed lines.
Figure 2A:
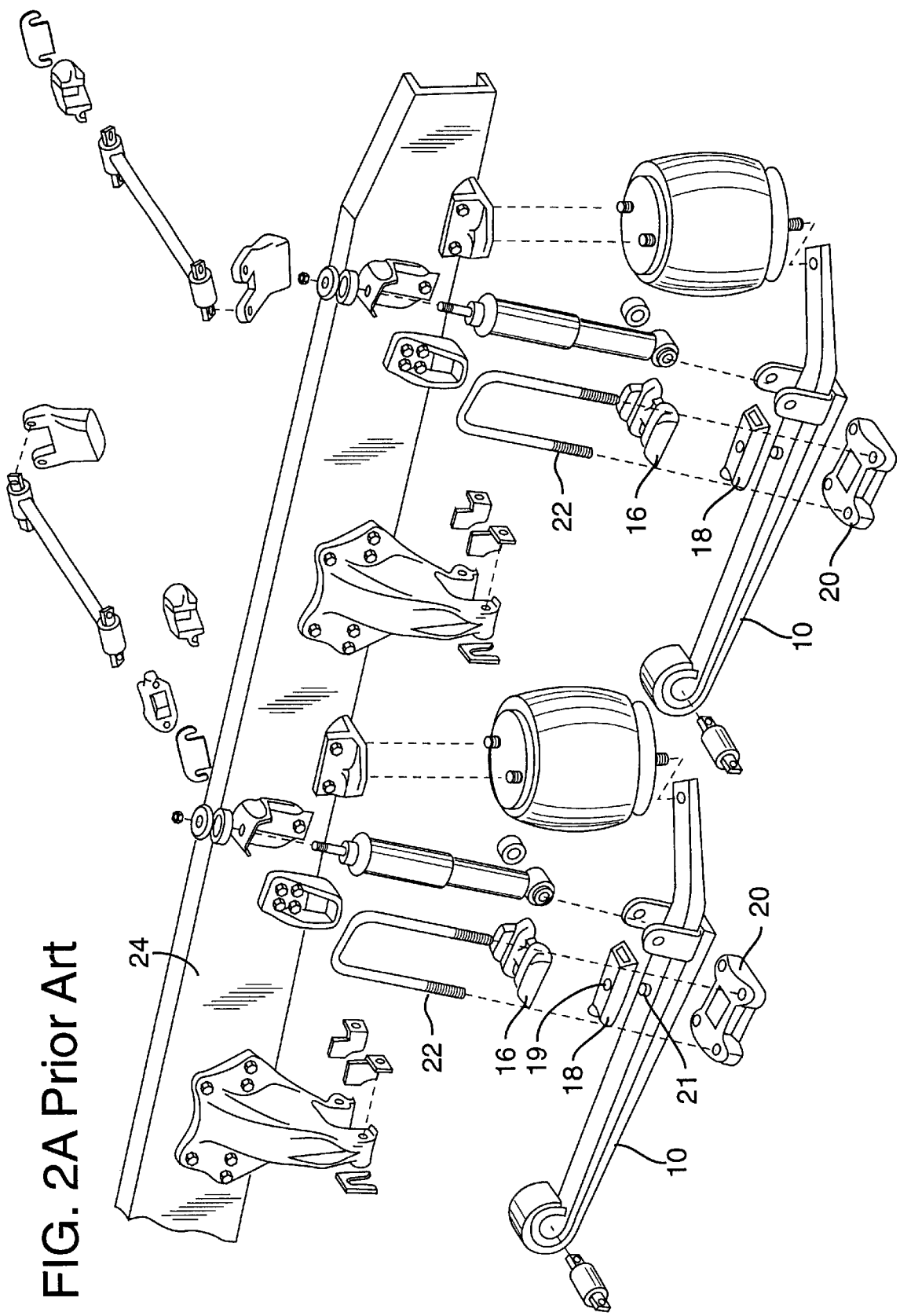
FIG. 2A is an exploded perspective view of the prior art axle seat and suspension system of FIG. 1 without the axle.

The axle seat 18' and/or the springs 10 may include positioning features to facilitate positioning and aligning these components during assembly. In one specific implementation, the seat 18' has an opening 66 for receiving a dowel or pin (such as the pin 21 in FIG. 2A) projecting upwardly from the springs 10. The pin 21 is conventional as shown in FIG. 2A.

To minimize parts inventory, the same seat 18' may be used on the opposite end of the axle from that shown in FIG. 3, in which case the latch portion 62 would be inserted into the slot 38. In the illustrated embodiment, the slots 36, 38 are sized slightly greater than the size of latch portion 62 in the direction perpendicular to the base 50 to allow some rotational freedom of the latch portion 60 within the associated slot and to facilitate assembly of the suspension system.

The illustrated axle 12 includes an axle housing 42 and a rotating axle portion 44 rotatably supported within the axle housing 42. In the specific implementation shown in FIG. 3, the axle seat 18' is positioned against the axle housing 42, and the brake housing and brake flange 56 are also mounted to the axle housing 42.

FIGS. 4A, 4B, 4C and 4D illustrate the seat 18' in greater detail. These figures show the first and second legs 32, 34 with the respective axle seat retainer receiving slots 36, 38, the optional pin receiving opening 66 and the axle seat retainer accommodating channel 40. In addition, as shown, the axle seat 18' includes front and rear legs 80 and 82, respectively. The front and rear legs 80, 82 can include cradle portions 90 and 92 that contact fore and aft surfaces of the axle housing 42, respectively. In one form, each cradle portion 90, 92 includes two upwardly projecting fingers 94 separated by a U-shaped cut-out 96.

As best shown in FIGS. 4C and 4F, a top surface 97 of the axle seat 18' can include an angled or inclined portion that contacts the axle 12 and, more specifically, the axle housing 42 in the illustrated embodiment. The angle of the angled portion is determined based on the desired pinion angle. In a specific implementation, the angled portion is at an angle of about 6° downward, relative to horizontal, from the forward side to the aft side of the seat 18'. As best shown in FIG. 4F, a bottom surface of the axle seat 18' may be formed with webs 98 to enhance the structural integrity of the axle seat 18', yet without the added weight of a solid construction.

FIGS. 5A and 5B show second and third embodiments, respectively, of the axle seat. These two embodiments are for respective opposite ends of the axle 12. The axle seat 18" of FIG. 5A and the axle seat 18''' of FIG. 5B each have a single leg 32' projecting outwardly in an outward direction toward the end of the axle 12 when mounted in place. In other respects, the construction of the axle seats 18" and 18''' is similar to the axle seat 18'. FIGS. 5C and 5D show side views of the axle seats 18" and 18'''.

FIGS. 6A–6D show one form of the axle seat retainer 30 in greater detail. As shown, the illustrated retainer comprises a link with a stem portion 60 that curves from the base 50 to the latch portion 62. The base 50 is shaped to follow the circumference of the brake flange 56. The base 50 includes two apertures 52 dimensioned to correspond to two apertures 54 in the brake flange 56. The apertures 54 in the brake flange 56 used for securing the axle seat retainer 30 may be adjacent or, as shown, non-adjacent (e.g., with one or more unused apertures therebetween).

The illustrated latch portion 62 may be slightly wedge-shaped to facilitate engagement with the slots 36, 38. In particular, the outboard side of the latch portion 62 can be tapered by an angle θ, which is shown exaggerated in FIG. 6B. In one specific implementation, the latch portion is formed with a 3° taper from the stem 60 to the tip of the latch portion 62 on the outboard side of the latch portion 62 that faces the base 50. Thus, at least a portion of the outboard side surface of the latch portion in this example diverges from the base moving from the stem portion toward the distal end of the latch portion. Similarly, the respective outboard sides of the slots 36, 38 may be tapered or inclined (e.g., by 3°) from the lower surface of the seat 18', i.e., the surface spaced furthest from the axle housing, toward the upper surface of the axle seat, i.e., the surface closest to the axle housing. As a result, engagement between the latch portion 62 and the slots 36, 38 occurs at the surface of engagement and the force transmitted through the axle seat retainer 30 is not undesirably concentrated at the tip of the latch portion 62.

FIGS. 7A–7D and 8A–8D show second and third embodiments, respectively, of the axle seat retainer 30. In the axle seat retainer 30' of the second embodiment and the axle seat retainer 30" of the third embodiment, the stem 60 is split into first and second leg portions 60a and 60b that join the base 50. Also, the axle seat retainer 30' and the axle seat retainer 30" each include three apertures 52 for attachment to the brake flange 56. In the specific implementation shown, the middle of the three apertures 52 is between the first and second portions leg 60a and 60b of the stem 60.

In the axle seat retainer 30', the latch portion 62 is aligned with the middle of the apertures 52 (FIG. 7C). In the axle seat retainer 30", the latch portion 62 is offset from the middle of the apertures 52 (FIG. 8C). The first and second leg portions 60a and 60b are spaced from the middle aperture to allow access to a nut or through-bolt extending through the middle aperture and between the leg portions 60a and 60b.

Figure 1:
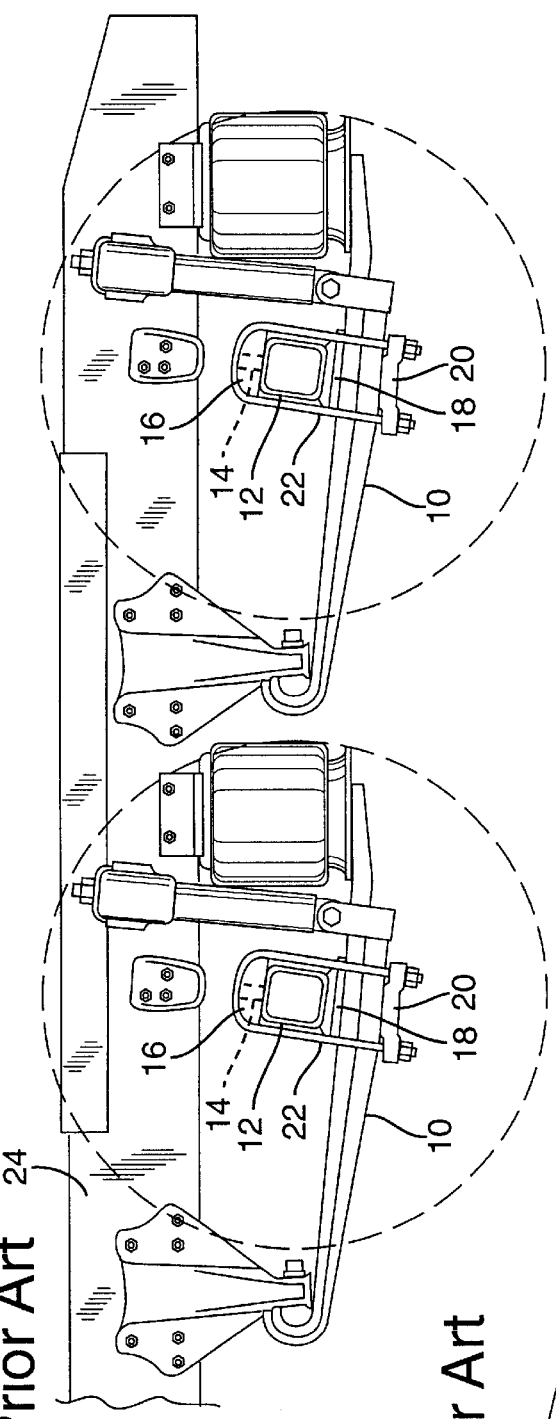
FIG. 1 is a side elevation view of a prior art axle seat in a vehicle suspension system with the axle supported above the leaf springs.

During assembly, the axle seat retainer 30 is fastened to the brake flange 56, e.g., with the through-bolts 100 and the nuts 102, and then the axle seat 18' is placed into contact with the axle 12 with the slot 36 engaged with the latch portion 62 of the axle seat retainer 30. In addition to the axle seat retainer 30, the axle seat 18' is secured to the axle with the leaf springs 10, clamping element 20 and upper axle retainer 16 using U-bolts 22, as shown in FIGS. 1, 2A and 2B, or using other suitable mounting arrangements.

The axle seat and axle seat retainer are preferably made of iron, although any other suitable material could be used.

Having illustrated and described the principles of our invention with reference to several preferred embodiments, it should be apparent to those of ordinary skill in the art that the invention may be modified in arrangement and detail without departing from such principles. We claim all modifications which fall within the scope and spirit of the following claims.

What is claimed is:

1. A vehicle spring movement limiting apparatus that limits lateral shift of a vehicle spring along a vehicle axle in an inboard direction toward a vehicle frame and in an outboard direction away from the vehicle frame, the apparatus comprising:

a first element in contact with the axle and coupled to the vehicle spring, the first element being positioned beneath the vehicle spring; and a second element separate from and engageable with the first element, the second element being fixed relative to the vehicle axle against inboard and outboard movement along the vehicle axle, the first element directly contacting the second element so as to limit movement of the first element and thereby the vehicle spring in the inboard and outboard directions.

2. The spring movement limiting device of claim 1, wherein the second element slidably engages the first element.

3. The spring movement limiting device of claim 1, wherein the first element comprises an axle seat having a body and a projecting leg with a slot and wherein the second element comprises an axle seat retainer having a projection inserted into the slot.

4. The spring movement limiting device of claim 1, wherein a brake flange is secured to the axle at a predetermined position along the axle and wherein the second element is secured to the brake flange.

5. The spring movement limiting device of claim 4, wherein the brake flange includes a periphery with a plurality of spaced brake flange apertures, and wherein the second element includes at least two apertures respectively aligned with corresponding brake flange apertures.

6. The spring movement limiting device of claim 1, wherein the axle includes an axle housing with a substantially flat surface, and wherein the first element comprises an axle seat with a substantially flat mating surface that contacts the flat surface of the axle housing.

7. The spring movement limiting device of claim 6, wherein the axle seat has a fore end and an aft end, and wherein the mating surface is angled downwardly relative to horizontal from the fore end to the aft end when the axle seat mating surface is in contact with the flat surface of the axle housing.

8. The spring movement limiting device of claim 1, wherein the second element does not contact the vehicle spring.

9. A vehicle spring movement limiting device that limits lateral shift of a vehicle spring along a vehicle axle, comprising:
 a first element in contact with the axle and coupled to the vehicle spring; and
 a second element separate from the first element and fixed in place at a predetermined position in an axle direction, the second element being engageable with the first element to limit the first element and the vehicle spring from movement in the axle direction,
 wherein a portion of the second element is captured between the first element and the axle when the first element and the second element are engaged.

10. The spring movement limiting device of claim 9, wherein the first element includes a channel adjacent the axle and the second element includes a link, and wherein the channel accommodates a portion of the link when the first element and the second element are engaged.

11. The spring movement limiting device of claim 9, wherein the second element includes a projection with a tapered surface and the first element includes a slot with a correspondingly tapered surface, such that when the second element engages the first element, the projection tapered surface engages the slot tapered surface.

12. An axle seat for use in a vehicle suspension having an axle, a spring, and an axle seat retainer, the axle seat comprising:
 a body having a spring receiving portion adapted for coupling to the spring;
 the body also having at least one axle seat retainer engagement portion adapted for sliding engagement with the axle seat retainer; and
 the body including an axle coupling portion adapted for coupling to the axle,
 wherein the spring receiving portion, the axle retainer engagement portion and the axle coupling portion are formed as a single piece.

13. The axle seat of claim 12, wherein the axle retainer engagement portion includes a projecting leg with an aperture, and wherein the aperture is sized to slidably receive the axle seat retainer to engage the axle seat and axle seat retainer.

14. The axle seat of claim 13, wherein the aperture comprises a slot dimensioned to permit movement of the axle seat retainer relative to the axle seat perpendicular to the longitudinal axis of the axle.

15. The axle seat of claim 12, wherein the axle coupling portion has a fore end and an aft end and is angled downwardly relative to horizontal from the fore end to the aft end.

16. The axle seat of claim 12, wherein the axle coupling portion defines a cradle which is adapted to receive the axle.

17. The axle seat of claim 12, wherein the body includes first and second engagement portions projecting outwardly from the body in opposite directions, each engagement portion comprising a leg with an axle retainer receiving slot formed therein.

18. An axle seat retainer for use in a vehicle suspension having an axle, an axle seat coupled to the axle, and a vehicle spring coupled to the axle seat, the axle seat retainer comprising:
 a mounting portion including a base for coupling to the axle; and
 a stem portion projecting from the base; and
 an axle seat engagement portion including a hook portion spaced from the base by the stem portion,
 wherein the axle seat retainer is positioned at a predetermined fixed position relative to the axle and the hook portion slidably engages the axle seat.

19. The axle seat retainer of claim 18, wherein the base has at least two apertures.

20. The axle seat retainer of claim 18, wherein the base has an arcuate periphery and has three apertures formed therein.

21. The axle seat retainer of claim 18, wherein the hook portion has an axle seat engaging surface positioned to face the base, and wherein at least a portion of the axle seat engaging surface diverges from the base.

22. The axle seat retainer of claim 18, wherein the stem portion is split into two leg portions that each join the mounting portion.

23. The axle seat retainer of claim 22, wherein the base includes a plurality of apertures, and wherein the projection is aligned with one of the apertures.

24. The axle seat retainer of claim 22, wherein the projection is offset from the center of the base.

25. An axle assembly for a vehicle having a longitudinally extending frame, comprising:
 an axle having a longitudinal axis which is transverse to the frame of the vehicle;
 a spring positioned adjacent the axle;
 a two-part spring retainer having a first axle seat part in contact with the axle and coupled to the spring and a second axle seat retainer part secured at a predetermined position along the longitudinal axis of the axle, the predetermined position of the second axle seat part being spaced in the longitudinal direction from where the first axle seat part contacts the axle, and the first axle seat part being positioned between the spring and the axle; and
 wherein the first axle seat part engages the second axle seat retainer part to limit movement of the axle seat along the axle.

26. A method of limiting the movement of a spring in a vehicle suspension system in inboard and outboard directions along a vehicle axle, the method comprising:
 removable attaching a first element to the axle;
 coupling the first element to the spring such that the first element is positioned between the spring and the axle;
 securing a second element to the axle at a predetermined position along the axle, the predetermined position being spaced along the axle from the first element; and
 engaging the first element with the second element, thereby limiting movement of the spring and the first element in the inboard and outboard directions along the axle.

27. The axle seat of claim 12, wherein the axle seat retainer engagement portion includes a projecting leg with a slot, and wherein an outboard side of the slot is tapered from an axle seat surface spaced furthest from the axle toward an axle seat surface closest to the axle.

28. The axle seat of claim 12, wherein the axle seat is configured for use on either end of the axle.

29. The axle seat of claim 12, wherein the spring receiving portion, the axle seat retainer engagement portion, and the axle coupling portion are each adapted to accommodate placement of the axle seat on the top or the bottom of the axle.

30. The spring movement limiting device of claim 1, wherein the first element is positioned between the vehicle spring and the axle.

* * * * *

UNITED STATES PATENT AND TRADEMARK OFFICE
CERTIFICATE OF CORRECTION

PATENT NO. : 6,257,606 B1  Page 1 of 1
DATED : July 10, 2001
INVENTOR(S) : Paul R. Hynes et al.

It is certified that error appears in the above-identified patent and that said Letters Patent is hereby corrected as shown below:

<u>Column 4,</u>
Line 9, "arculate" should read -- arcuate --.
Line 22, "potion" should read -- portion --.

Signed and Sealed this

Tenth Day of June, 2003

JAMES E. ROGAN
*Director of the United States Patent and Trademark Office*